United States Patent
Kowalski et al.

[11] Patent Number: 6,085,104
[45] Date of Patent: Jul. 4, 2000

[54] PILOT AIDED, TIME-VARYING FINITE IMPULSE RESPONSE, ADAPTIVE CHANNEL MATCHING RECEIVING SYSTEM AND METHOD

[75] Inventors: John M. Kowalski; Srinivas Kandala, both of Vancouver, Wash.; V. Srinivasa Somayazulu, Tigard, Oreg.

[73] Assignee: Sharp Laboratories of America, Inc., Camas, Wash.

[21] Appl. No.: 09/048,240

[22] Filed: Mar. 25, 1998

[51] Int. Cl.[7] .................................................. H04B 15/00
[52] U.S. Cl. .................... 455/506; 455/226.3; 370/335
[58] Field of Search ........................... 455/506, 226.3, 455/307; 375/350, 200, 349, 347; 370/342, 335, 252, 519

[56] References Cited

U.S. PATENT DOCUMENTS

| | | | |
|---|---|---|---|
| 5,109,390 | 4/1992 | Gilhousen et al. | 375/1 |
| 5,237,586 | 8/1993 | Bottomley | 370/206 |
| 5,329,547 | 7/1994 | Ling | 375/1 |
| 5,542,101 | 7/1996 | Pal | 455/65 |
| 5,568,472 | 10/1996 | Umeda et al. | 370/18 |
| 5,586,113 | 12/1996 | Adachi et al. | 370/342 |
| 5,619,524 | 4/1997 | Ling et al. | 375/200 |
| 5,636,246 | 6/1997 | Tzannes et al. | 375/260 |
| 5,638,362 | 6/1997 | Dohi et al. | 370/342 |
| 5,659,573 | 8/1997 | Bruckert et al. | 375/200 |
| 5,673,286 | 9/1997 | Lomp | 375/208 |
| 5,737,327 | 4/1998 | Ling et al. | 370/335 |
| 5,809,020 | 9/1998 | Bruckert et al. | 370/335 |
| 5,812,542 | 9/1998 | Bruckert et al. | 370/335 |
| 5,889,815 | 3/1999 | Iwakiri | 375/205 |

FOREIGN PATENT DOCUMENTS

| | | |
|---|---|---|
| 0696856 | 2/1996 | European Pat. Off. |
| 0795971 | 9/1997 | European Pat. Off. |
| 0825737 | 2/1998 | European Pat. Off. |
| WO 9430024 | 12/1994 | WIPO. |
| WO 9733400 | 9/1997 | WIPO. |

OTHER PUBLICATIONS

Article entitled, "Wideband–CDMA Radio Control Techniques for Third–Generation Mobile Communication Systems", by S. Onoe, K. Ohno, K. Yamagata and T. Nakamura, published by 1997 IEEE, pp. 835–839.

Article entitled, Experiments on Coherent Multicode DS–CDMA, by T. Dohi, Y. Okumura, A. Higashi, K. Ohno and F. Adachi, published by IEICE Trans. Commun. vol. E79–B No. 9, Sep. 1996, pp. 1326–1332.

Article entitled, Fast Cell Search Algorithm in DS–CDMA Mobile Radio Using Long Spreading Codes, by K. Higuchi, M. Sawahashi and F. Adashi, published in IEEE VTC Conference, pp. 1430–1434, May, 1997.

Article entitled, "Coherent Multicode DS–CDMA Mobile Radio Access", by F. Adachi, K. Ohno, A. Higashi, T. Dohi and Y. Okumurai published in IEICE Trans. Commun. vol. E79–B, No. 9 Sep., 1996.

Document entitled "An Overview of the Application of Code Division Multiple Access (CDMA) to Digital Cellular Systems and Personal Cellular Networks", May 21, 1992, updated and retitled version submitted to TIA TR45.5 Subcommitte on Mar. 28, 1992, pp. 1–57.

*Primary Examiner*—Dwayne D. Bost
*Assistant Examiner*—Erika A. Gary
*Attorney, Agent, or Firm*—David C. Ripma; Matthew D. Rabdau

[57] ABSTRACT

A wideband receiver, including a time-varying finite impulse response (FIR) filter, has been provided to combine multipath communications of data in response to pilot channel timing information. The time-varying FIR processes the multipath communications through independent signal paths. Each signal path includes a variable delay circuit and a variable gain circuit. The delay of each separate signal path is adjusted and made equal in response to the pilot channel timing information. Likewise, the gain of each signal path is adjusted in response to pilot channel gain information to maximize the signal to noise ratio of the combined signal paths. The separate signal paths are then summed in a combiner circuit. The time-varying FIR permits the data communication to be summed either before, or after demodulation. A method of combining multipath communications using a time-varying FIR is also provided.

13 Claims, 7 Drawing Sheets

PILOT AIDED, TIME-VARYING FINITE IMPULSE RESPONSE, ADAPTIVE CHANNEL MATCHING RECEIVING SYSTEM AND METHOD

BACKGROUND AND SUMMARY OF THE INVENTION

This invention relates generally to cellular telephone communications, and more particularly to a system and method for mobile stations to use the pilot channel timing information to combine the various multipath signals from a base station.

Spread spectrum communication techniques allow communicating users to operate in noisy radio frequency (RF) spectrums, and are especially effective against narrow-band interferers. Spread spectrum communications can be effected at relatively low power spectral densities, and multiple users can share the same frequency spectrum. Further, receivers can be designed to protect against multipath. These system characteristics encouraged early development of the technology by the military.

Common forms of spread spectrum systems include chirp, frequency hopping, and direct sequence or pseudonoise (PN). The chirp system transmits an impulse signal in the time domain that is spread monotonically in the frequency domain. A receiver converts the spread frequency signal back into an impulse signal. These frequency-spread impulse signals have applications in radar, for the pulse position modulation of information, or both, such as the $R^3$ transponder developed by General Dynamics, Electronics Division in the 1970s. Frequency hopping systems communicate by synchronizing users to simultaneously change the communication frequency.

Direct Sequence systems spread a digital stream of information, typically in a quadriphase modulation format, with a PN code generator, to phase shift key modulate a carrier signal. The pseudonoise sequence of the PN code generator is periodic, and the spread signal can be despread in a receiver with a matching PN code. Direct Sequence systems have excellent immunity to noise. The PN codes used typically permit a large number of users to share the spectrum, with a minimum of correlation between the user's PN codes. However, Direct Sequence system require large RF bandwidths and long acquisition times.

The IS-95 standard defines key features of the so-called second generation code division multiple access (CDMA) communication system, a type of Direct Sequence spread spectrum modulation. To help solve the problem of long acquisition time, the IS-95 signal uses a pilot channel. Each base station transmits a pilot channel message spread with PN codes known to all the mobile stations. The PN code is made up a series of phase shifted binary symbols called chips. The PN period is 32,768 chips and the PN chip rate is 1.2288 Megahertz (Mhz). The digital stream of information that is spread by the PN code is also known to the mobile stations. Because there is no ambiguity in the demodulated message, the timing characteristics of the PN code, down to the chip phase, as well as the QPSK modulation phase are known to the mobile station receiver.

The IS-95 system communicates information from the base station to the mobile stations through a series of traffic channels. These traffic channels are transmit and receive information, i.e. digitized audio signals, spread with a traffic channel PN code, unique to each mobile station. Using this precise timing and phase information derived from the pilot channel, the mobile station is able to acquire a setup channel, and eventually, the overall System Time. With this System Time, the mobile station is able to differentiate between base stations and synchronize the demodulation circuitry with sufficient accuracy to recover the received traffic channel message.

A third generation, wideband CDMA (W-CDMA) system is in development as described in "Wideband-CDMA Radio Control Techniques for Third Generation Mobile Communication Systems", written by Onoe et al., IEEE 47$^{th}$ Vehicular Technology Conference Proceedings, May 1997, that may have global applications. Instead of a pilot channel, the W-CDMA system has a broadcast, or perch channel. Each timeslot, or slot of the broadcast channel consists of a series of time multiplexed symbols. A long code masked, or special timing symbol segment uses just a short code to spread one symbol of known information. This segment allows a mobile station to acquire system timing information immediately after turn-on. The pilot, or reference symbols are similar to the IS-95 pilot channel. In one proposal, 4 reference symbols, with each symbol being 2 bits, are spread with a long code and a short code. The reference symbol information and the short code are known by the mobile stations. The long code is unique to each base station, so that timing information is refined, once the long code is known (the base station is identified). Therefore, according to some proposals, 5 symbols in the slot would be dedicated to the mobile station acquiring timing information. Further, both the long and short codes spread 5 symbols of data during each slot. Since information is not predetermined for the data symbols, precise timing information cannot be accurately recovered, as with the other two kinds of (timing) symbols. Other combinations of reference, special timing, and data symbols are also possible.

The W-CDMA system also includes several traffic channels to communicate information, such as a digitized voice or data. The traffic channel predominately includes information, but may also include a reference symbol segment. For example, at a data rate of 32 kilosymbols per second (ksps), a slot could include 4 pilot symbols and 16 information symbols. Precise timing information can be derived during the reference symbols segment of the traffic channel message, but not during the information segments.

Implementations of a RAKE receiver employing separate despreading circuitry for each detected path can be highly complex for multiple coded CDMA signals. Furthermore, implementing a RAKE receiver for such signals requires either separate sets of weights for each despread CDMA signal, or for a single set of weights to be multiplexed and subsequently weighted with the various despreader outputs.

The task of decoding CDMA signals is simplified with the use of matched filters, such as the matched filter to used to decode pilot symbols in the W-CDMA system. Analog discrete time signal processing does not consume a large amount of power, relative to digital signal processing (DSP) implementations. Such analog discrete time signal processing elements include delay elements, multipliers, summers.

Co-pending patent application, Ser. No. 09/015,424, invented by Kowalski, Kandala, and Somayazulu, entitled SYSTEM AND METHOD FOR CDMA CHANNEL ESTIMATION, filed on Jan. 29, 1998, and assigned to the same assignees as the instant application, discloses a procedure for using timing derived from the perch channel in a wideband CDMA system to despread and demodulate the traffic channels. Although the system simplifies the operation of the traffic channel, a traffic channel RAKE section is still required for every multipath signal.

Gilhousen, et al., U.S. Pat. No. 5,109,390, disclose a spread spectrum receiver capable of differentiating multiple pilot signals and selecting the signal of greatest strength. The transmitting base stations are synchronized to operate from a master clock. Receiving mobile stations can maintain timing accuracy sufficient to demodulate received messages from all base stations by monitoring the pilot channel of any single base station. However, Gilhousen et al. do not disclose a method of reducing the number of traffic channel RAKE sections, or an efficient manner of summing the traffic channel data.

Lomp, U.S. Pat. No. 5,673,286, discloses a system of fixed delay sections used to combine despread traffic channel messages to increase the signal to noise ratio of the received signal, while simplifying the receiver section. However, the system sill requires a significant number of traffic channel RAKE sections. The use of fixed delays does not permit the capture all possible multipath variations of a transmitted signal. Further, the use of fixed delay sections introduces noise into the recovered signal when a multipath variation of a signal is not acquired by the system.

Prior art descriptions of the RAKE matched filter, employing a finite impulse response filter prior to despreading, do not detect more than a single distinct signal path. Moreover, the prior art does not describe a means for controlling the use of tap weights (delay) in the signal output, resulting in an undesirable increase in noise at the combiner output. In addition, these RAKE weights consume chip real estate and power. It would be desirable to utilize a RAKE receiver in which energy was combined only from those delays in which a signal was actually detected, consistent with a minimal use of hardware resources.

It would be advantageous if a CDMA receiver design could be simplified to reduce the number of parts and decrease the receiver's power consumption.

It would be advantageous if the number of traffic channel RAKE sections could be reduced without degrading the signal to noise ratio of the receives signals.

It would be desirable for a CDMA receiver architecture to be able to utilize either discrete time analog signal processing, or to use digital signal processing and discrete time analog signal processing together.

It would be advantageous if the channel estimates derived from the pilot channel could be applied to all the received channels of the same transmission path. In this manner, channel estimation need only be performed once.

It would be advantageous if the traffic channel multipath signals could be combined using the timing information derived from their corresponding pilot channel signals. It would be desirable if CDMA signals, other than the pilot signals, could be despread with a single despreader circuit. That is, it would be advantageous if the traffic channels could be delayed in response to the pilot channel timing information, and then combined in a single traffic channel signal.

Accordingly, in a wideband wireless communication system where base stations transmit information to mobile stations, and the communications from a base station to a mobile station are propagated along multiple transmission paths, with each transmission path having a corresponding path delay, a method for combining received communications from the multiple transmission paths is provided. The method comprising the steps of:

a) routing the received communications of each transmission path in parallel;

b) variably adjusting the delay of each parallel routed communication, compensating for the timing differences between transmission paths, whereby all the path delays are made equal; and c) summing the communications with compensated path delays, whereby the communications from the multiple transmission paths are combined to improve the signal to noise ratio of the communications.

Prior to Step a), each transmission path of the received communications is identified and a time delay associated with each identified transmission path is calculated. Then, Step b) includes adjusting the delay of each transmission path in response to the delay calculated for each identified transmission path.

Each transmission path has a corresponding received signal strength, therefore, the step of calculating the time delay associated with each transmission path also includes calculating a weight associated with the received signal strength of each transmission path. A further step follows Step b), and preceding Step c), of:

$b_1$) variably adjusting the weight of each parallel routed communication in response to the step of calculating the weights, compensating for the signal strength differences between identified transmission paths. In this manner, the signal to noise ratio of the combined communications is maximized.

In one aspect of the invention, the communications system is a code division multiple access (CDMA) system and the communications from a base station to a mobile station are formatted in a plurality of channels, including a pilot channel spread with a code, and a traffic channel with time multiplexed data symbols spread with code, and in which the step of identifying the transmission paths includes despreading the coded pilot channel.

The step of calculating a time delay for each transmission path includes generating a despreading code which is synchronized with the received communications to despread the pilot channel. A transmission path delay is generated in response to synchronizing the despreading code. Then, Step c) includes combining the traffic channel data symbols before they are despread. A following step despreads the traffic channel data symbols summed in Step c).

A time-varying finite impulse response (FIR) filter for combining received communications from a plurality of transmission paths is also provided comprising a plurality of variable delay circuits, a plurality of variable weighting circuits, and a combiner. Each delay circuit corresponds to a transmission path and has a signal input to accept received communications, a control input to set the delay through the delay circuit, and a signal output to provide the delayed communications. In this manner, compensation is made for the timing differences between identified transmission paths, and all the path delays are made equal.

Each weighting circuit corresponds to a transmission path and has a signal input operatively connected to a corresponding delay circuit signal output. A control input sets the weight, and a signal output operatively connected to a corresponding combiner input provides the weighted communications. In this manner, compensation is made for the signal strength differences between identified transmission paths, and all the signal to noise ratio of the combined communications is maximized.

The combiner has a plurality of inputs, with each input operatively connected to a corresponding weighting circuit signal output. The combiner has an output to provide the summation of the plurality of transmission path communications. The signal to noise ratio of the received communications is improved by combining all transmission paths.

Typically, time-varying FIR is part of a receiver for combining received communications from a plurality of transmission paths. When the communications system is a CDMA system, and the communications from a base station to a mobile station are formatted in a plurality of channels, including a pilot channel spread with a code, the receiver further comprises a plurality of pilot channel RAKE receiver sections with each pilot channel RAKE receiver section corresponding to a transmission path. Each pilot channel RAKE receiver section accepts CDMA communications, identifies a transmission path, and generates a despreading code to despread the pilot channel of the identified transmission path. The despreading code is used to derive path delay and to provide the path delay on an output operatively connected to the corresponding delay circuit input control. In this manner, the path delays for each transmission path are calculated in response to despreading the pilot channel, and used to control the delay circuits.

Likewise, each pilot channel RAKE receiver section measures the signal strength of its identified transmission path to determine a weight. The pilot channel RAKE receiver section has an output operatively connected to the corresponding weighting circuit input control to provide weighting in response to the transmission path signal strength. The signal strengths for each transmission path are calculated in response to despreading the pilot channels, and used to control the weighting circuits.

The receiver includes a traffic channel despreading circuit having an input operatively connected to the combiner output. The traffic channel despreading circuit has an output to provide the despread data symbols combined from a plurality of transmission paths.

Each delay circuit of the time-varying FIR further comprises a plurality of delay subcircuits each having a predetermined fixed delay. Each delay subcircuits has an input to accept communications, and an output to provide delayed communications. Each subcircuit is serially connected, with a preceding subcircuit output being operatively connected to a following subcircuit input. The delay circuit also comprises a switch having a signal input selectively connectable to one of the delay subcircuits outputs. The switch has an input control to select the operative connection between the switch signal input and one of the subcircuit outputs. The switch has a signal output to provide the delayed communication. The communications through the variable delay circuit are delayed in finite steps with the use of the delay subcircuits and switch.

DETAILED DESCRIPTION OF THE PREFERRED EMBODIMENT

Figure 1:
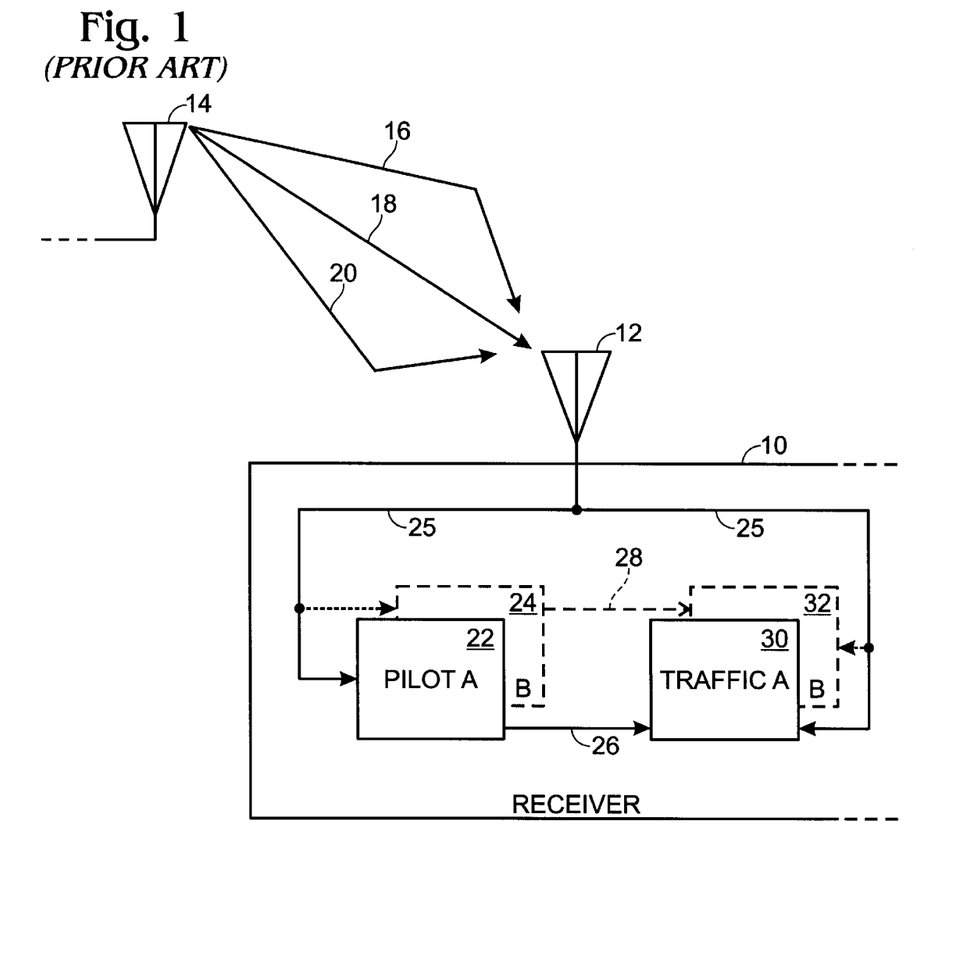
FIG. 1 is a schematic representation of a CDMA receiver (prior art).

FIG. 1 is a schematic representation of a CDMA receiver 10 (prior art). Receiver 10 has an antenna 12 to receive a plurality of CDMA transmissions from transmitter antenna 14. Due to multipath, a plurality of transmission paths, represented by reference designators 16, 18, and 20, exist between antennas 12 and 14. Each transmission path 16, 18, and 20 has a corresponding path delay and signal strength relative to receiving antenna 12.

Typically, the CDMA communications to receiver 10 include a plurality of simultaneously occurring orthogonally coded channels. Some channels are used for acquisition and maintenance functions and are transparent to the user. The pilot channel is such a channel, supplying timing and phase information. Traffic channels are used to communicate data. Timing information derived from the pilot channel is used to track and decode the traffic channels.

Receiver 10 includes a plurality of pilot channel RAKE receiver sections, pilot RAKE A 22 and pilot RAKE B 24. For clarity, only two pilot RAKE sections 22 and 24 are shown, although receiver 10 may include several more pilot RAKE sections. Each pilot RAKE section 22 and 24 is operatively connected to antenna 12 on line 25. Pilot RAKE section 22 despreads and demodulates the pilot channel of a specific transmission path, for example, transmission path 16. Pilot RAKE section 24 despreads and demodulates the pilot channel of another specific transmission path, for example, transmission path 18. Timing information derived from pilot RAKE section 22 is provided at an output on line 26, and timing information derived from pilot RAKE section 24 is provided at an output on line 28.

Receiver 10 also includes a plurality of traffic channel RAKE receiver sections, of which two are shown. Traffic RAKE A and B, 30 and 32, have inputs operatively connected to antenna 12 with line 25 to receive communications. Timing information on line 26 from pilot RAKE A 22 is input into traffic RAKE A 30 and used to despread and demodulate the traffic channel associated with transmission path 16. That is, there is a correspondance between transmission path 16, pilot RAKE A 22, and traffic RAKE A 30. Likewise, timing information on line 28 from pilot RAKE B 24 is input into traffic RAKE B 32 and used to despread and demodulate the traffic channel associated with transmission path 18.

Once the traffic channels of each traffic RAKE receiver 22 and 24 are decoded, it is possible to combine the channels to improve the signal to noise ratio of the received data. However, weighting and addition circuitry (not shown) must be added to receiver 10 to properly combine signals, and the signals must be tracked in order to properly time the despreading sequences. In the prior art, the multiplicity of despreaders despread the input signal, and the resultant despread signals are weighted and summed. The use of separate pilot and traffic RAKE sections for each transmission path requires either a multiplicity of weights and summing circuits for each signal despread, or a single set of weights and summer with a multiplexing circuit. For a large number of CDMA signals to be despread and combined, the multiplexing circuit will have undesirable complexity and consume much power.

Figure 2:
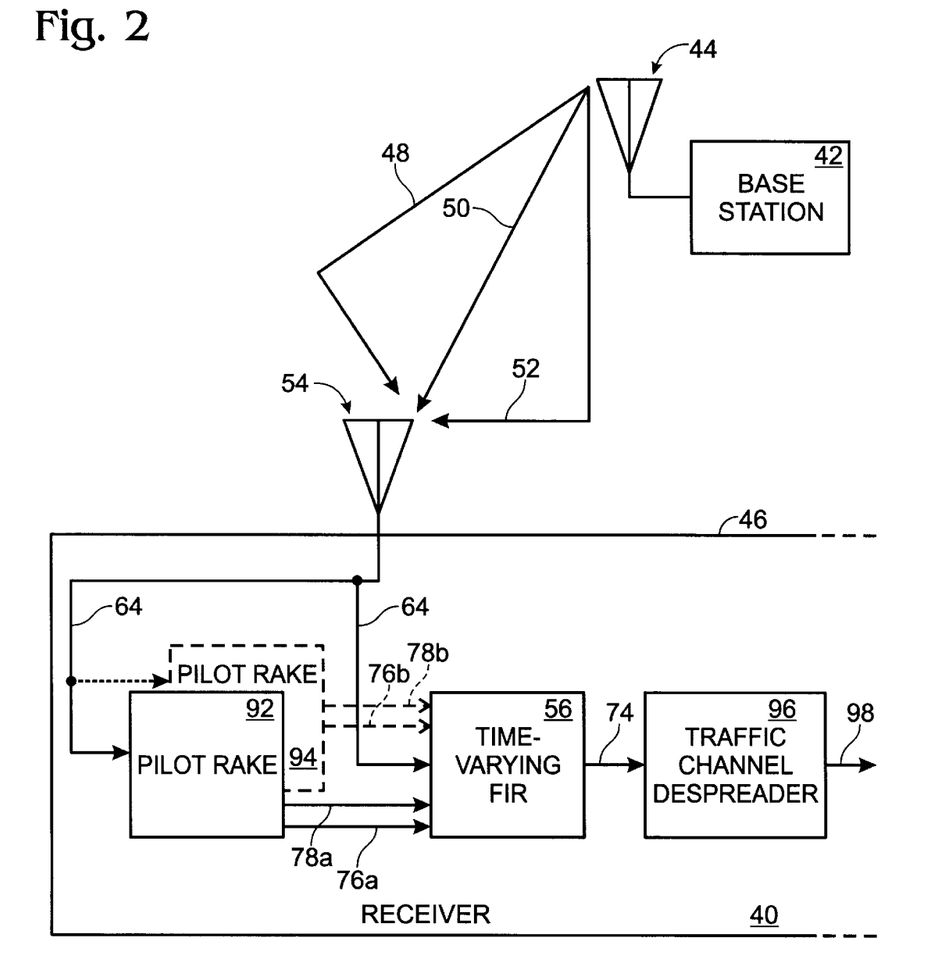
FIG. 2 is a schematic representation of a receiver of the present invention for combining received communications from a plurality of transmission paths.

FIG. 2 is a schematic representation of a receiver 40 of the present invention for combining received communications from a plurality of transmission paths. Receiver 40 operates in a wideband wireless communication system including a plurality of base stations, such as base station 42 with antenna 44 transmitting information to a plurality of mobile stations, such as mobile station 46 associated with receiver 40. Base station 42 communications are propagated along a plurality of transmission paths, such as transmission paths 48, 50, and 52, to receiver antenna 54. Each transmission path 48, 50, and 52 has a corresponding path delay and signal strength.

Figure 3:
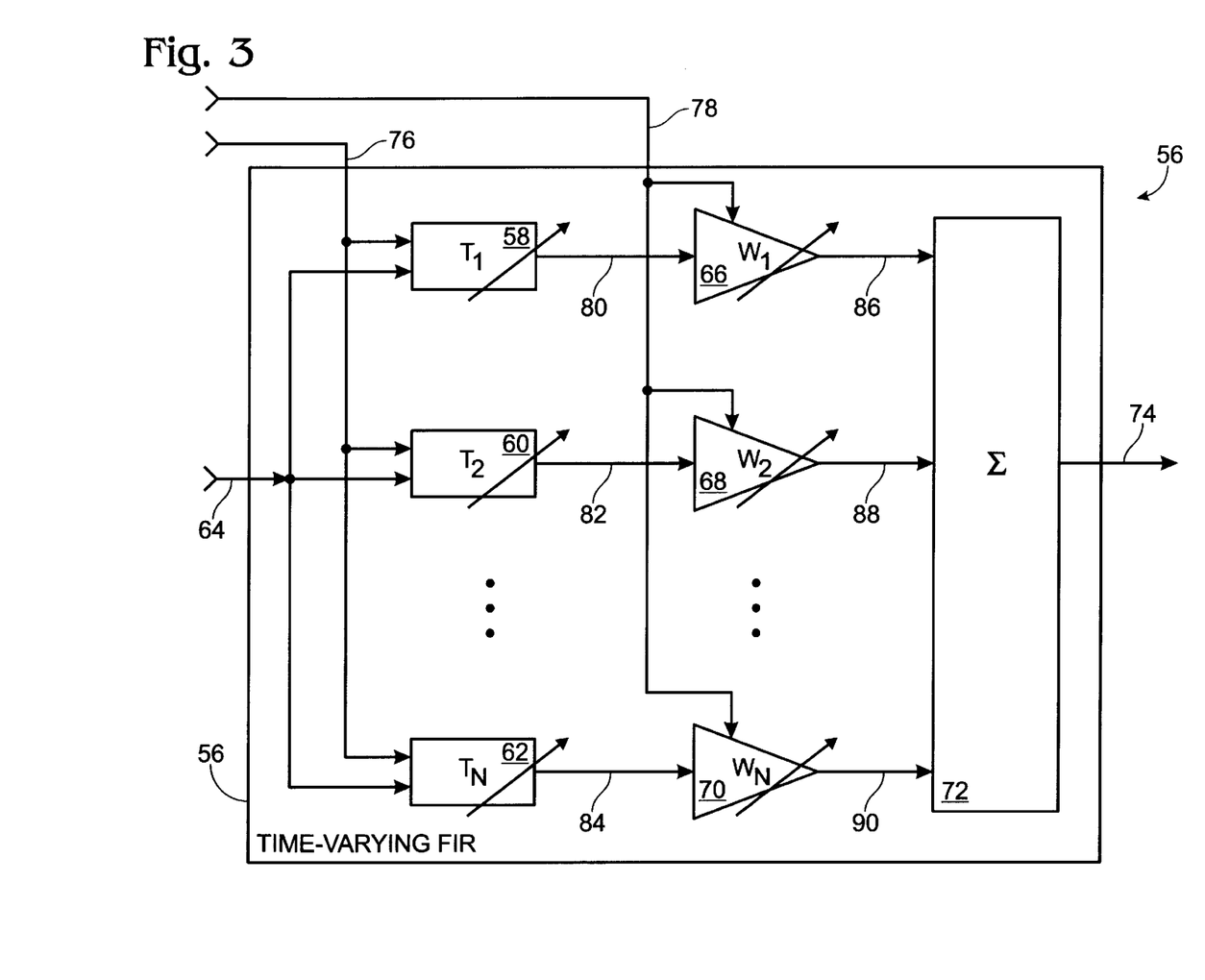
FIG. 3 is a more detailed representation of a time-varying finite impulse response (FIR) filter of the receiver of FIG. 2.

FIG. 3 is a more detailed representation of a time-varying finite impulse response (FIR) filter 56 of receiver 40 of FIG. 2. Time-varying FIR 56 and, therefore, receiver 40 include a plurality of variable delay circuits $T_1$, $T_2$, and $T_N$, with reference designators 58, 60, and 62, respectively. It is understood that time-varying FIR 56 is not limited to only three variable delay circuits. The dotted lines between $T_2$ 60 and $T_N$ 62 are intended to represent the potential of a large number of variable time delay circuits. Time-varying FIR filter has a signal input on line 64 operatively connected to the signal input of each variable delay circuit 58, 60, and 62. Even though there is only a single input line 64, transmission paths 48, 50, and 52 are routed in parallel through time-varying FIR 56, by assigning a particular delay circuit to a particular transmission path.

Time-varying FIR 56 also includes a plurality of variable weighting circuits $W_1$, $W_2$, and $W_N$, with reference designators 66, 68, and 70, respectively. It is understood that time-varying FIR 56 is not limited to only three variable weighting circuits. The dotted lines between $W_2$ 68 and $W_N$ 70 are intended to represent the potential of a large number of variable weighting circuits.

Time-varying FIR 56 includes a combiner 72 and a signal output on line 74 operatively connected to the output of combiner 72. The signal output on line 74 provides compensated communications. That is, the communications of each transmission path have been adjusted in gain and delay to permit the combination of communications from each path. Time-varying FIR 56 has a delay control input on line 76 operatively connected to the control inputs of delay circuits 58, 60, and 62. For example, line 76 is a data bus in some aspects of the invention. Alternately, as represented in FIG. 2, line 76 is a plurality of delay control lines, a separate line between each pilot RAKE section and its corresponding variable delay circuit. Delay control signals to the control input of a variable delay circuit set the delay through the delay circuit. Time-varying FIR 56 also has a weighting control input on line 78 operatively connected to the control inputs of weighting circuits 66, 68, and 70. For example, line 78 is a data bus in some aspects of the invention. Alternately, as represented in FIG. 2, line 78 is a plurality of delay control lines, a separate line between each pilot RAKE section and its corresponding variable weighting circuit. Weighting control signals to the control input of a variable weighting circuit set the weighting, or gain through the weighting circuit.

Each of delay circuits 58, 60, and 62 correspond to a transmission path and have a signal input operatively connected to antenna 54 through line 64 to accept received communications. Compensation is made for the timing differences between identified transmission paths, and all the path delays are made equal with the use of variable delay circuits 58, 60, and 62. Variable delay circuits delay 58, 60, and 62 derive their delay values from their respective pilot signal trackers, to which they are operatively connected.

Likewise, the plurality of variable weighting circuits 66, 68, and 70 correspond to a transmission path. Variable weighting circuits 66, 68, and 70 have signal inputs, respectively, on lines 80, 82, and 84 which are operatively connected to the output of the corresponding delay circuit signal output. For example, the transmission path represented by reference designator 48 in FIG. 2 corresponds to variable delay circuit 58 and variable weighting circuit 66. Weighting circuits 66, 68, and 70 have signal outputs on lines 86, 88, and 90, respectively, operatively connected to a corresponding input of combiner 72 to provide the weighted communications. That is, compensation is made for the signal strength differences between identified transmission paths, and the signal to noise ratio of the combined communications is maximized by weighting circuits 66, 68, and 70. That is, the communications associated with a each transmission path are emphasized to optimize the overall signal to noise ratio at the output of combiner 72 with a maximal ratio combining technique. The communications of a transmission path with a high signal to noise ratio is given more emphasis than the communications of a transmission path with a low signal to noise ratio.

Combiner 72 has a plurality of inputs on lines 86, 88, and 90. Each combiner input is operatively connected to a corresponding delay circuit, through a corresponding weighting circuit signal output. Combiner 72 has an output on line 74 to provide the summation of the plurality of transmission path communications. That is, combiner 72 sums the received communications of each transmission path after compensation has been made for variations in signal strength and path delay. In this manner, the signal to noise ratio of the received communications is improved by combining all transmission paths In some aspects of the invention the communications system includes a plurality of base stations transmitting to a plurality of mobile stations, and is a CDMA system, although the system of the present invention is applicable to any coherently demodulated wideband communication system. That is, any system where variations in multipath delay, over time, are small compared to the communication symbol signaling rate. The communications from a base station to a mobile station are typically formatted in a plurality of channels, including a pilot channel spread with a code, such as a PN code. The pilot channel is structured in accordance with IS-95 standards in some aspects of the invention. Alternately, the pilot channel is structured in accordance with the third generation wideband-CDMA standards.

Returning to FIG. 2, receiver 40 further comprises a plurality of pilot channel RAKE receiver sections 92 and 94. For the purposes of simplicity and clarity, only two pilot RAKE sections are depicted. However, the dotted lines defining pilot RAKE 94 are intended to imply a potential of a large number of pilot RAKE receiver sections between RAKE 92 and RAKE 94. Each pilot channel RAKE receiver section corresponds to a transmission path. For example, pilot RAKE 92 corresponds to transmission path 48, and pilot RAKE 94 corresponds to transmission path 50. Pilot channel RAKE receiver sections 92 and 94 have inputs to accept CDMA communications on line 64, which is operatively connected to antenna 54. Typically, the communications received at antenna 54 are at radio frequencies, although the use of any carrier frequency is possible. These communications are converted to baseband before they are introduced to the pilot RAKE sections 92 and 94, and time-varying FIR 56.

Pilot channel RAKE receiver sections 92 and 94 identify a transmission path when code acquisition and tracking circuitry is included as part of RAKE sections 92 and 94. Alternately, pilot RAKE sections 92 and 94 are operated with associated acquisition and code tracking circuitry. Each pilot RAKE section acquires the pilot channel associated with a specific transmission path delay. For example, pilot RAKE 92 identifies transmission path 48 and pilot RAKE 94 identifies transmission path 50. Pilot RAKE sections 92 and 94 independently generate a despreading code to despread the pilot channel of the identified transmission path. The generation of the pilot despread signals, and their tracking, leads to the provision of path delays on a first output operatively connected to its corresponding delay circuit input control. For example, pilot RAKE 92 identifies transmission path 48 by generating a despreading code to despread the pilot channel. The process of generating the despreading code also generates the path delay associated with transmission path 48. The path delay information is output on 76a to the control input of variable delay circuit 58 of time-varying FIR 56 (see FIG. 3) to control delay circuit 58. FIG. 2 depicts the delay signals being output on individual lines 76a and 76b to operatively connect, respectively, to the control inputs of variable delay circuits 58 and 60. Alternately, as shown in FIG. 3, the delay control signals are on a single data bus joining the first output of pilot RAKE sections 92 and 94, and the control inputs of variable delay circuits 58, 60, and 62. Either way, the path delays for each transmission path are calculated in response to despreading the pilot channel, and used to control the delay circuit corresponding the pilot RAKE.

Pilot channel RAKE receiver sections 92 and 94, or external circuitry associated with the RAKE sections measure the signal strength of identified transmission paths 48 and 50, respectively, to determine a weight. Pilot channel RAKE receiver sections have a second output operatively connected with lines 78a and 78b to the input controls of corresponding weighting circuits 66 and 68, respectively, to provide weighting in response to the transmission path signal strength. Alternately, as shown in FIG. 3, the weighting control signals are on a single data bus joining the second output of pilot RAKE sections 92 and 94, and the control inputs of variable weighting circuits 66, 68, and 70. Either way, the signal strengths for each transmission path are calculated in response to despreading the pilot channels, and used to control the weighting circuits.

Typically, CDMA communications from a base station to a mobile station also include a traffic channel with time multiplexed data symbols spread with a code. Receiver 40 further comprises a traffic channel despreading circuit 96 having an input operatively connected on line 74 to the output of time-varying FIR 56 and, ultimately, to the output of combiner 72 (see FIG. 3). Traffic channel despreading circuit 96 has an output on line 98 to provide the despread data symbols combined from a plurality of transmission paths, such as paths 48 and 50.

Receiver 40 of FIG. 2 has only one traffic channel despreading circuit 96 for the received communications of all transmission paths 48, 50, and 52, and other transmission paths not shown. Further, the plurality of traffic channel communications from each transmission path are combined before any digital signal processing is required. In comparison, receiver 10 of FIG. 1 requires a plurality of traffic channel despreading circuits 30 and 32. The traffic channel communication of each transmission path must be separately despread and demodulated before any summing operations are performed.

Figure 4:
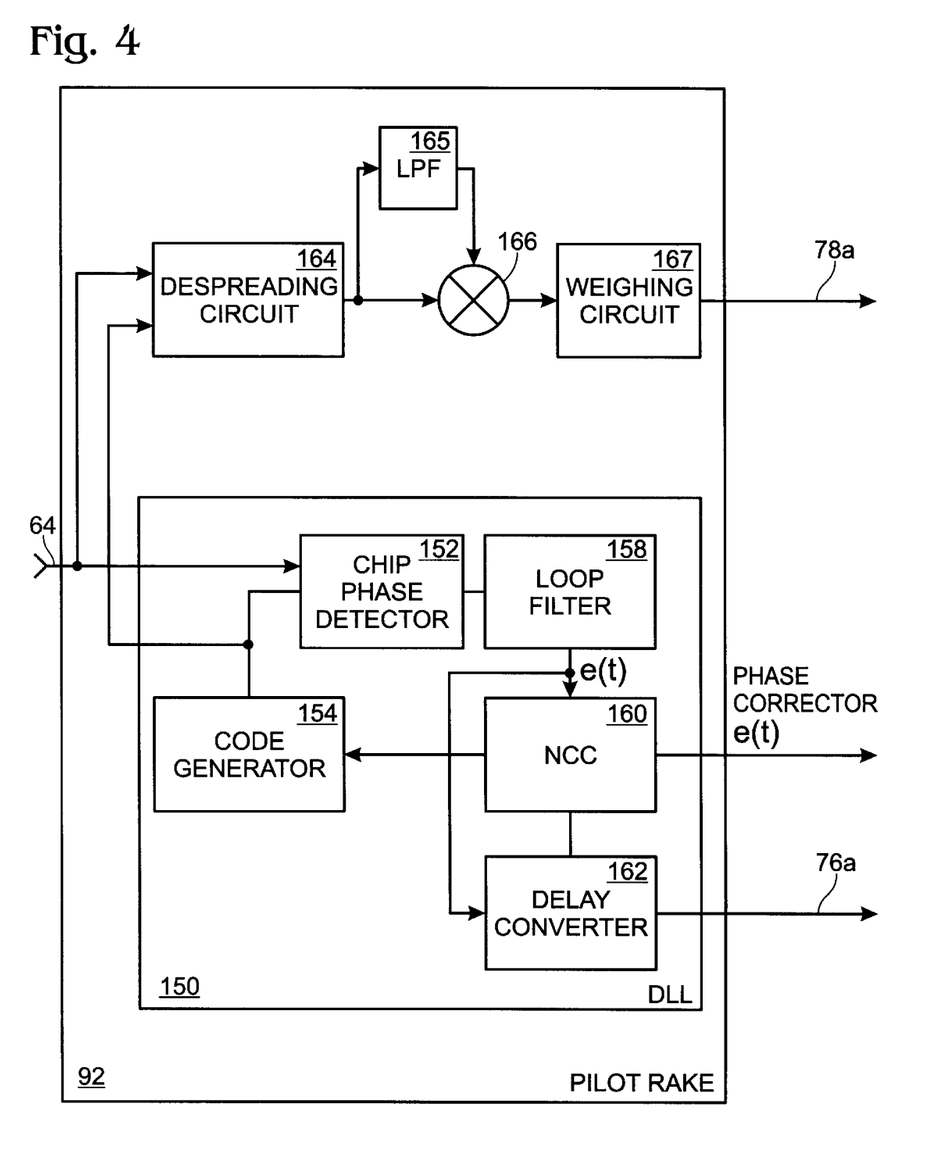
FIG. 4 is a schematic representation of a delay locked loop (DLL) used in the pilot RAKE section of the present invention receiver of FIG. 2.

FIG. 4 is a schematic representation of a delay locked loop (DLL) 150 included in pilot RAKE section 92 of the present invention receiver 40 of FIG. 2. Each pilot RAKE section of receiver 40 includes DLL 150, or equivalent tracking circuit. Alternately, the tracker is located external to the pilot RAKE, but operates in conjunction with the pilot RAKE section. Pilot RAKE section 94, and any other pilot RAKE section of receiver 40, also include similar DLL, tracker, or associated tracker circuits. DLL 150 includes a chip phase detector 152 to receive communication on line 64 and to receive a despreading code generated by code generator 154. In communication systems having more complicated pilot channels, such as wideband-CDMA, several despreading codes are received by chip phase detector 152. The output of detector 152 is filtered with loop filter 158, and used to enable a numerically controlled clock (NCC) 160, voltage controlled oscillator, or the like. NCC 160, in turn, provides phase corrections to code generator 154, as is well known in the art. These code phase corrections are also the third output of pilot RAKE 92. The output of loop filter 158 (e(t)) is also supplied to a delay converter circuit 162. The output of delay converter circuit is the path delay associated with transmission path 48 output on the first output of pilot RAKE 92 of receiver 40 on line 76a. In other aspects of the invention (not shown), delay converter circuit 162 is located outside the pilot RAKE section. DLL 150 synchronizes the timing between generated despreading code and the code spread communications received on the identified transmission path 48 and generates a phase error signal which is converted into path delay.

Received communications on line 64 and the despreading code from code generator 154 are input into despreading circuit 164, where the pilot channel is decoded. The output of despreading circuit 164 is filtered in low pass filter 165 and multiplied by itself in mixer 166. The output of mixer 166 is presented to weighting circuit 167 where a measurement of the signal strength of the identified transmission path is made to determine a weight. The weighting is provided on the second output of pilot RAKE 92 on line 78a of receiver 40.

Figure 5:
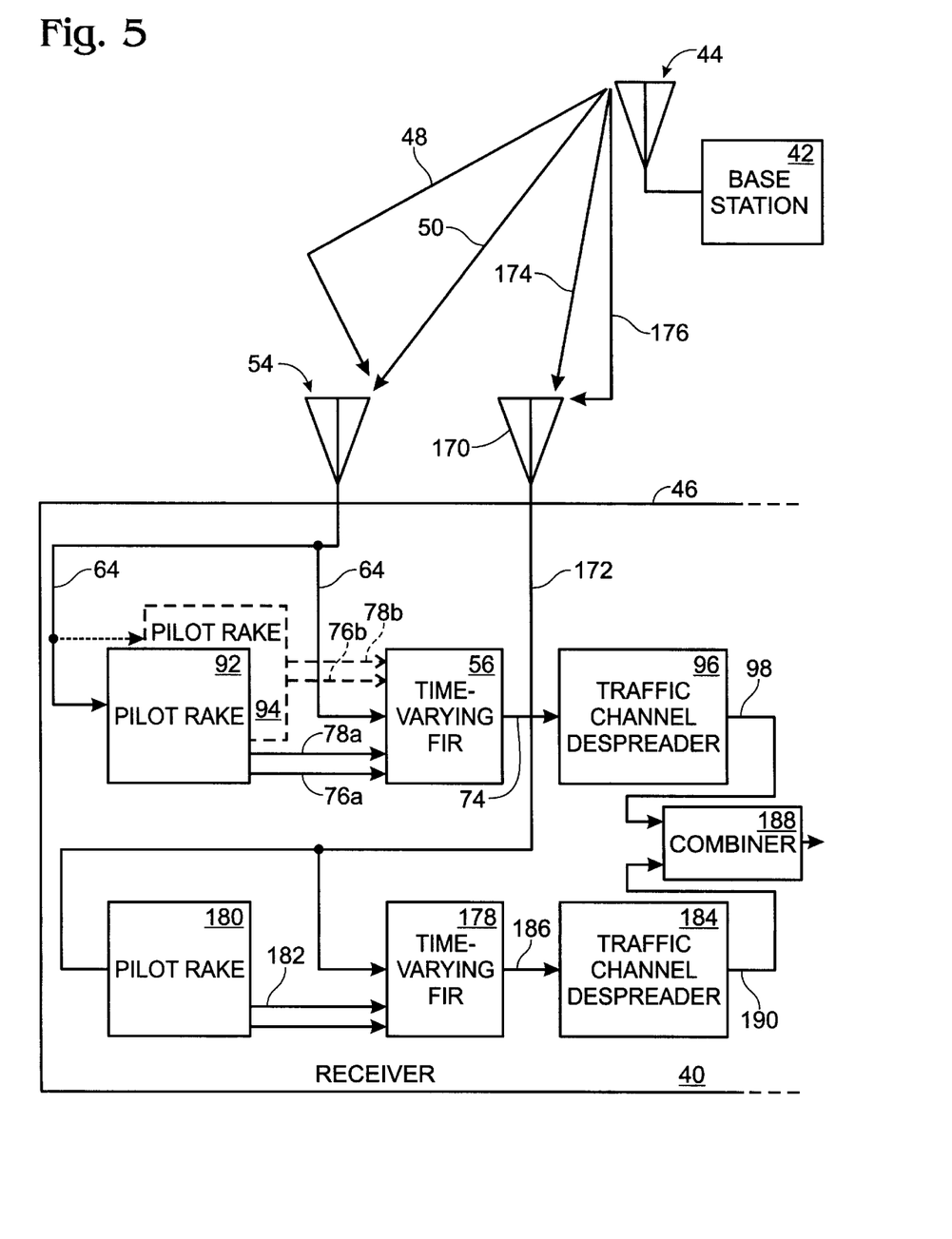
FIG. 5 illustrates the present invention receiver of FIG. 2 with at least two antennas.

FIG. 5 illustrates present invention receiver 40 of FIG. 2 with at least two antennas 54 and 170. Antennas 54 and 170 has inputs to accept communications and have outputs on lines 64 and 172, respectively, operatively connected to receiver 40. In this manner, a larger number of transmission paths are provided to the receiver. That is, receiver 40 receives communications on additional transmission paths 174 and 176. As stated above in the description of FIG. 2, first time-varying FIR filter 56 has a signal input operatively connected to a first antenna on line 64. At least a second time-varying FIR filter 178 is operatively connected to second antenna 170 with line 172. The signal diversity is improved with a larger number of signal paths. There are a plurality of pilot RAKE receiver sections associated with second antenna 170 and second time-varying FIR 178. These pilot RAKE sections operate identically to pilot RAKE sections 92 and 94. For the purposes of clarity and simplicity, only a single pilot RAKE section 180 is shown associated with second time-varying FIR 178 having a first output with path delay information on line 182. Typically, there are several pilot RAKE sections (not shown) with inputs operatively connected to second antenna 170.

Second time-varying FIR 178, substantially identical in operation and structure to time-varying FIR 56 of FIG. 2, is operatively connected to a traffic channel despreading circuit 184 on line 186. An antenna diversity combiner circuit 188 is operatively connected to first 56 and second 178 time-varying FIR outputs with lines 98 and 190, respectively. In this manner, the signal paths from the first and second antennas are combined.

Figure 6:
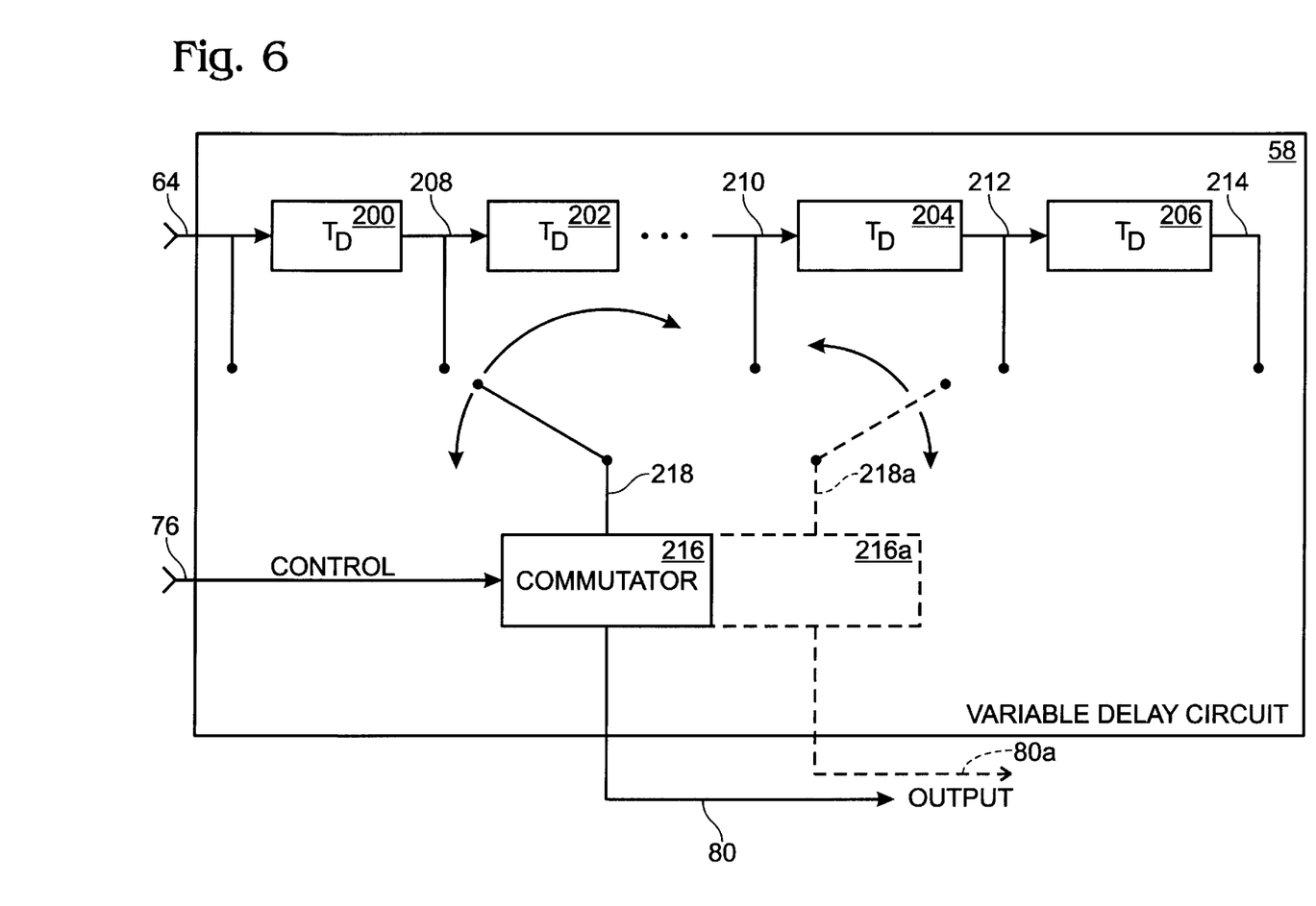
FIG. 6 is a schematic representation of a variable delay circuit, of time-varying FIR of FIG. 3.

FIG. 6 is a schematic representation of variable delay circuit 58, of time-varying FIR 56 of FIG. 3. Variably delay circuit 58, or any other variable delay circuit of time-varying FIR 56, comprises a plurality of delay subcircuits ($T_D$) 200, 202, 204, and 206. The dotted line between subcircuits 202 and 204 is intended to represent that many addition subcircuits are potentially used in some aspects of the invention.

Each delay subcircuit 200, 202, 204, and 206 has a predetermined fixed delay. Delay subcircuits 200, 202, 204, and 206 each have an input operatively connected on lines 64, 208, 210, 212, respectively, to accept communications, and an output, or tap operatively connected on lines 208, 210, 212, and 214, respectively, to provide delayed communications. Each subcircuit is serially connected, with a preceding subcircuit output being operatively connected to a following subcircuit input. For example, the output of delay subcircuit 200 is operatively connected on line 208 to the input of delay subcircuit 202.

A switch, or commutator 216 has a signal input on line 218 selectively connectable to one of the delay subcircuits outputs on lines 208, 210, 212, and 214. Switch 216 has an input control on line 76 to select the operative connection between switch signal input on line 218 and one of the subcircuit outputs on lines 208, 210, 212, and 214. Switch 216 has a signal output on line 80 to provide the delayed communication, whereby the communications through variable delay circuit 58 are delayed in finite steps with the use of delay subcircuits 200, 202, 204, and 206, and switch 216.

The proper design of time-varying FIR filter 56, and variable delay circuit 58 depend on the length of the delay on each tap. The design is also dependent on the mechanism for controlling the delays. Returning briefly to FIG. 4, tracker circuit, or DLL 150 has loop filter 158 which develops an error signal e(t). This signal is fed to NCC, or voltage controlled clock 160. Clock 160 is updated every symbol period, denoted as $T_s$. The purpose of the tracker is to track Doppler related variations of the chip clock, and to account for frequency instabilities in the base station clock.

Base station clock instabilities are relatively low, of the order of 0.2 ppm or less, which at 10 Mcps, for example, is on the order of 2 Hz, or less. Typical Doppler rates are 300 Hz, maximum, so by accounting for Doppler, one accounts for clock instabilities with a minimal loss of timing accuracy. In some mobile phone systems, the timing of the base stations is synchronized within one frame. In a system such as IS-95, base stations are closely synchronized, and the difference in delays received from multiple base stations arise from propagation delays.

Each pilot signal return that is detected, is tracked. When a mobile phone is not in diversity handover, the differences in delays between received signal paths arise from Doppler, and from propagation delay from individual scatterers. As such, the relative delays may be bounded as follows.

The relative delay due to doppler shift variations of the chip pulse repetition frequency is described as follows. In general, delay converter element 162 of FIG. 4 signals a time-varying delay given by $$\tau_d(t) = (1/f_c)\int_{-\infty}^{t} f_d(t)dt$$

where $f_c$ is the nominal chip rate in Hertz (Hz).

If there is a constant doppler shift of +/-$f_d$ Hz, then delay converter 162 signals a delay ramp (steadily decreasing or increasing delay, respectively, as the doppler shift is positive or negative) whose absolute slope is given by $f_d/f_c$. This is the worst case scenario, where a delay circuit 58 is unable to accommodate additional requests for a change in delay, since it can only provide a finite delay. When this happens, commutator arm 218 in FIG. 6 will have reached one or the other extremity of the delay chain of subcircuits (line 64 or 214). This problem is addressed in FIG. 4 with code generator 154 advancing or retarding the despreading code by a fixed number of chips, depending on whether $f_d$ is positive or negative. Commutator arm 218 of FIG. 4 is then simultaneously set to the steady state position. In steady state conditions, when no doppler variation is present, commutator arm 218 is generally biased to be connected in the center of the chain of subcircuits, such as to line 210.

The relative delay due to delay spread variations is described as follows. For certain scenarios, e.g., the channel model recommended by the International Telecommunications Union (ITU), path length differences of up to 55 µs are described. However, for the 4 strongest signals, which typically are the largest number of pilot signal returns actually used by tracker circuits such as DLL 150, the delay spread is typically less than 10 µs. Returning to FIG. 6, in some aspects of the invention, the minimum delay of each subcircuit, such as subcircuit 200, is 10 µs, and the maximum number of subcircuits is four. Alternately, more than one transmission path is delayed through a single delay circuit, such as delay 58. That is, subcircuits 200, 202, 204, and 206 have enough delay between them that delay can be "pooled and switched" between subcircuits. For example, a first, short delay, communication is picked off by commutator 216 at the output of subcircuit 200, with the delayed communication output on line 80. A second, long delay, communication is picked off by commutator 216a at commutator input 218a, and output on line 80a. In this aspect of the invention, delay circuit is connected, with lines 80 and 80a, to two different weighting circuits, or weighting circuit 66 is capable of weighting two different communications.

Figure 7:
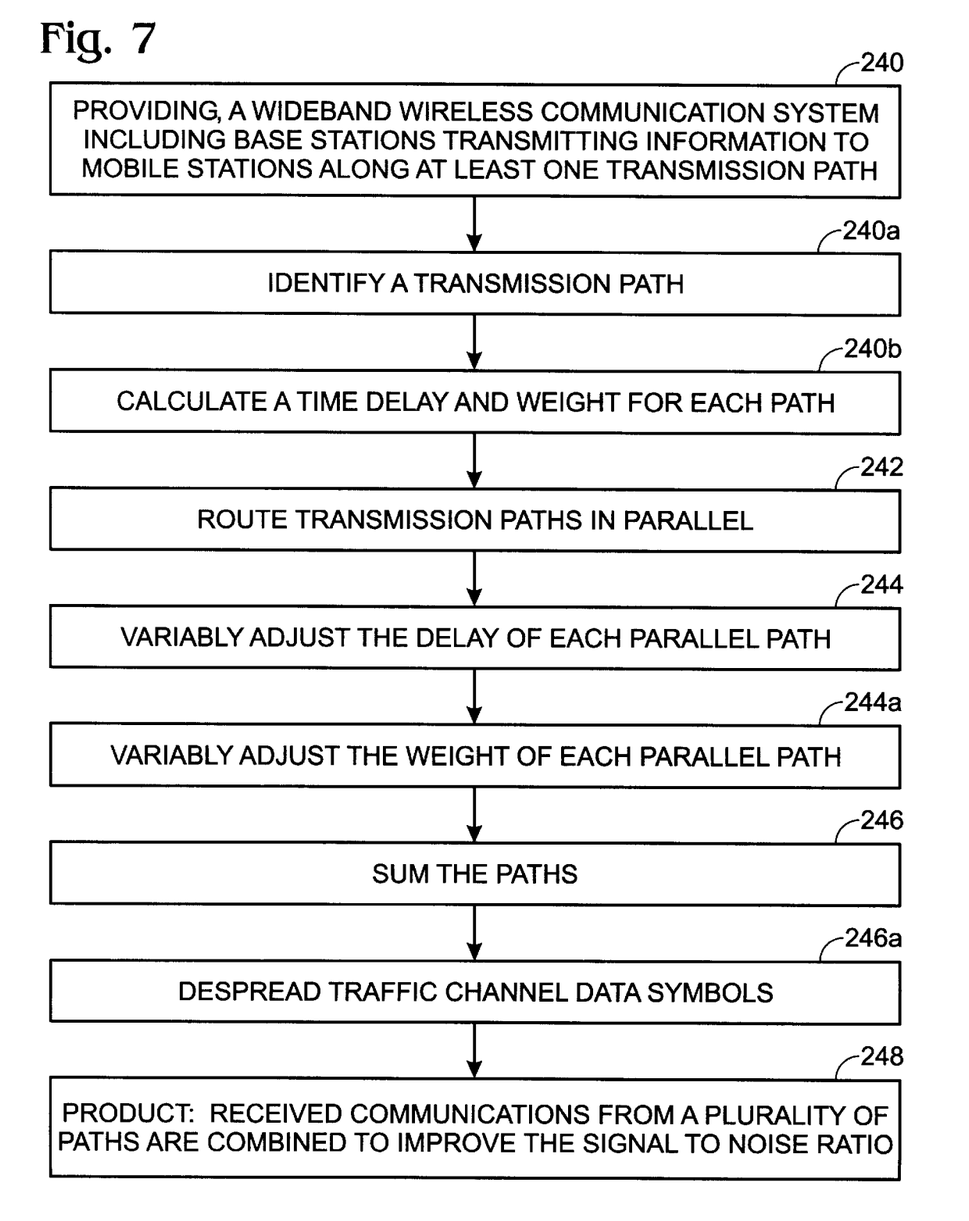
FIG. 7 is a flow chart illustrating a method for combining received communications from a plurality of transmission paths.

FIG. 7 is a flow chart illustrating a method for combining received communications from a plurality of transmission paths. Step 240 provides a wideband wireless communication system including a plurality of base stations transmitting information to a plurality of mobile stations, the communications from a base station to a mobile station being propagated along at least one transmission path, with a corresponding path delay. Step 242 routes the received communications of each transmission path in parallel. Step 244 variably adjusts the delay of each parallel routed communication, compensating for the timing differences between transmission paths, whereby all the path delays are made equal. Step 246 sums the plurality of communications with compensated path delays variably adjusted in Step 244. Step 248 is a product, where the communications from a plurality of transmission paths are combined to improve the signal to noise ratio of the communications.

Some aspects of the invention include further steps, preceding Step 242. Step 240a identifies each transmission path of the received communications. Step 240b calculates a time delay associated with each identified transmission path. Then, Step 244 includes adjusting the delay of each transmission path in response to the delay calculated for each identified transmission path.

Each transmission path has a corresponding received signal strength. Therefore, Step 240b also includes calculating a weight associated with the received signal strength of each transmission path. The method further comprises a step, following Step 244, and preceding Step 246. Step 244a variably adjusts the weight of each parallel routed communication in response to the step of calculating the weights, compensating for the signal strength differences between identified transmission paths. In this manner, the signal to noise ratio of the combined communications is maximized.

When the communications system is a code division multiple access (CDMA) system, the communications from a base station to a mobile station are formatted in a plurality of channels, including a pilot channel spread with a code, and a traffic channel with time multiplexed data symbols spread with code. Step 240*a*, the identification of the transmission paths, then includes despreading the coded pilot channel.

In some aspects of the invention, Step 240*b* includes generating a despreading code which is synchronized with the received communications to despread the pilot channel. The transmission path delay is generated in response to synchronizing the despreading code. Then, Step 246 includes combining the traffic channel data symbols before they are despread. Typically, the method further comprising a step, following Step 246. Step 246*a* despreads the traffic channel data symbols summed in Step 246.

In some aspects of the invention a plurality of pilot channel RAKE receiver sections are provided, with each pilot RAKE section corresponding to a transmission path. Each pilot channel RAKE receiver section has a delay locked loop (DLL) to synchronize despreading codes, and a weighting circuit to estimate signal strength and to calculate weights. Then, Step 240*a* includes acquiring the pilot channel of a transmission path with a pilot channel RAKE receiver section. Also, Step 240*b* includes using the DLL to generate the despreading code and to generate a time delay associated with the identified transmission path. Step 240*b* includes using the weighting circuit to calculate the signal strengths associated with the identified transmission path.

In some aspects of the invention a time-varying finite impulse response (FIR) filter is provided, including a plurality of variable delay circuits aligned in parallel and corresponding to transmission paths. Likewise, the time-varying FIR filter has a plurality of variable weighting circuits corresponding to transmission paths. Each parallel signal path including a variable weighting circuit operatively connected in series to a corresponding delay circuit. The time-varying FIR also includes a combiner to sum the parallel transmission paths after passing through the delay and weighting circuits. Then, Step 242 includes routing communications through the plurality of parallel delay and weighting circuits of the time-varying FIR. Step 244 includes adjusting the variable delay circuits in response to delays calculated by the DLL of the corresponding pilot channel RAKE receiver section. Step 244*a* includes adjusting the variable weighting circuit in response to weights calculated by the weighting circuit of the corresponding pilot channel RAKE receiver section. Step 246 includes summing the delay and weight compensated communications in the combiner.

A system and method to simplify wideband communication system using a RAKE receiver has been disclosed. Combining the various multipath traffic channels before they are despread drastically reduces the parts count of a receiver, and eliminates the power consumption of the unused DSP circuits. Further, the microprocessor is freed to perform other functions. The present invention uses a time-varying FIR to perform the channel combination function with timing data supplied from pilot RAKE fingers. Other variations and embodiments of the above-described invention will occur to those skilled in the art.

What is claimed is:

1. In a wideband wireless code division multiple access (CDMA) communication system including a plurality of base stations transmitting information to a plurality of mobile stations formatted in a plurality of channels including a pilot channel spread with a code and a traffic channel with time multiplexed data symbols spread with code, the communications from a base station to a mobile station being propagated along at least one transmission path, with a corresponding path delay, a method for combining received communications from a plurality of transmission paths comprising the steps of:

a) identifying each transmission path of the received communications and despreading the coded pilot channel;

b) estimating a time delay associated with each identified transmission path and generating a despreading code, which is synchronized with the received communications to despread the pilot channel;

c) routing the received communications of each transmission path in parallel; variably adjusting the delay of each parallel routed communication, compensating for the timing differences between transmission paths, whereby all path delays are made equal, wherein the delay of each transmission path is adjusted in response to the delay estimated for each identified transmission path and in response to synchronizing the despreading code; and d) summing the plurality of communications with compensated path delays variably adjusted before they are despread whereby the communications from a plurality of transmission paths are combined to improve the signal to noise ratio of the communications, including combining the traffic channel data symbols before they are despread.

2. The method as in claim 1 including the further steps, preceding Step a), of:

identifying each transmission path of the received communications;

calculating a time delay associated with each identified transmission path; and in which Step c) includes adjusting the delay of each transmission path in response to the delay calculated for each identified transmission path.

3. A method as in claim 2 wherein each transmission path has a corresponding received signal strength, in which the step of calculating the time delay associated with each transmission path also includes calculating a weight associated with the received signal strength of each transmission path, and further comprising a step, following Step c), and preceding Step d), of:

$c_1$) variably adjusting the weight of each parallel routed communication in response to the step of calculating the weights, compensating for the signal strength differences between identified transmission paths, whereby the signal to noise ratio of the combined communications is maximized.

4. A method as in claim 2 wherein a plurality of pilot channel RAKE receiver sections are provided with each pilot RAKE section corresponding to a transmission path, with each pilot channel RAKE receiver section having a delay locked loop (DLL) to synchronize despreading codes, and a weighting circuit to estimate signal strength and calculate weights, in which the step of identifying each transmission path includes acquiring the pilot channel of a transmission path with a pilot channel RAKE receiver section, in which the step of calculating path delays includes using the DLL to generate the despreading code and to generate a time delay associated with the identified transmission path, and in which the step of calculating the transmission path weights includes using the weighting circuit to calculate the signal strengths associated with the identified transmission path.

5. A method as in claim 4 wherein a time-varying finite impulse response (FIR) filter is provided including a plurality of variable delay circuits aligned in parallel and corresponding to transmission paths, and a plurality of variable weighting circuits, each parallel signal path including a variable weighting circuit operatively connected in series to a corresponding delay circuit, a combiner to sum the parallel transmission paths after passing through the delay and weighting circuits, in which Steps a) includes routing communications through the plurality of parallel delay and weighting circuits of the time-varying FIR, in which Step b) includes adjusting the variable delay circuits in response to delays calculated by the DLL of the corresponding pilot channel RAKE receiver section, in which Step $b_1$) includes adjusting the variable weighting circuit in response to weights calculated by the weighting circuit of the corresponding pilot channel RAKE receiver section, and in which Step c) includes summing the delay and weight compensated communications in the combiner.

6. A method as in claim 1 further comprising a step, following Step c), of:

d) despreading the traffic channel data symbols summed in Step c).

7. In a wideband wireless communication system receiver to accept communications propagated along at least one transmission path with a corresponding path delay and signal strength, a time-varying finite impulse response (FIR) filter for combining received communications from a plurality of transmission paths comprising:

a plurality of variable delay circuits, each said delay circuit corresponding to a transmission path and having a signal input to accept received communications, a control input to set the delay through said delay circuit, and a signal output to provide the delayed communications, whereby compensation is made for the timing differences between identified transmission paths, and all the path delays are made equal, said delay circuit further comprising:

i) a plurality of delay subcircuits each having a predetermined fixed delay, said delay subcircuits having an input to accept communications, and an output to provide delayed communications;

ii) in which each said subcircuit is serially connected, with a preceding subcircuit output being operatively connected to a following subcircuit input; and iii) a switch having a signal input selectively connectable to one of said delay subcircuits outputs, an input control to select the operative connection between said switch signal input and one of said subcircuit outputs, and a signal output to provide the delayed communication, whereby the communications through said variable delay circuit are delayed in finite steps with the use of said delay subcircuits and said switch;

a plurality of variable weighting circuits with each said weighting circuit corresponding to a transmission path and having a signal input operatively connected to said corresponding delay circuit signal output, a control input to set the weight, and a signal output operatively connected to said corresponding combiner input to provide the weighted communications, whereby compensation is made for the signal strength differences between identified transmission paths, and the signal to noise ratio of the combined communications is maximized; and a combiner having a plurality of inputs, with each said input operatively connected to said corresponding weighting circuit signal output, said combiner having an output to provide the summation of the plurality of transmission path communications, whereby the signal to noise ratio of the received communications is improved by combining all transmission paths.

8. A time-varying FIR filter as in claim 7 in which said plurality of variable delay subcircuits includes a maximum of four said subcircuits, and in which the fixed delay of each said variable delay subcircuit is a minimum of 10 $\mu$s.

9. In a wideband wireless CDMA communication system including a plurality of base stations transmitting to a plurality of mobile stations, wherein communications are formatted in a plurality of channels, each channel including a pilot channel spread with a code propagated along a plurality of transmission paths, with each transmission path having a corresponding path delay, a receiver for combining received communications from a plurality of transmission paths comprising:

a plurality of variable delay circuits, each said delay circuit corresponding to a transmission path and having a signal input to accept received communications, a control input to set the delay through said delay circuit, and a signal output to provide the delayed communications, whereby compensation is made for the timing differences between identified transmission paths, and all the path delays are made equal;

a plurality of pilot channel RAKE receiver sections with each said pilot channel RAKE receiver section having an input to accept CDMA communications, each pilot channel RAKE receiver section identifying a transmission path, and generating a despreading code to despread the pilot channel of the identified transmission path and to provide the path delay on a first output operatively connected to said corresponding delay circuit input control, whereby the path delays for each transmission path are calculated in response to despreading the pilot channel and used to control said delay circuits, wherein each said RAKE receiver section includes a delay lock loop (DLL) operable to synchronize the timing between generated despreading code and the code spread communications received on the identified transmission path, said DLL also generating a phase error signal with is converted into Path delay;

a combiner having a plurality of inputs, with each said input operatively connected to a corresponding delay circuit signal output, said combiner having an output to provide the summation of the plurality of transmission path communications, whereby the signal to noise ratio of the received communications is improved by combining all transmission paths; and a plurality of variable weighting circuits with each said weighting circuit corresponding to a transmission path and having a signal input operatively connected to said corresponding delay circuit signal output, a control input to set the weight, and a signal output operatively connected to said corresponding combiner input to provide the weighted communications, whereby compensation is made for the signal strength differences between identified transmission path, and the signal to noise ratio of the combined communications is maximized; and in which said combiner circuit sums the received communications of each transmission path after compensation has been made for variations in signal strength and path delay.

10. A receiver as in claim 9 in which each said pilot channel RAKE receiver section measures the signal strength of its identified transmission path to determine a weight, and in which each said pilot channel RAKE receiver section has a second output operatively connected to said corresponding weighting circuit input control to provide weighting in response to the transmission path signal strength, whereby the signal strengths for each transmission path are calculated in response to despreading the pilot channels, and used to control said weighting circuits.

11. A receiver as in claim 9 wherein the communications from a base station to a mobile station also include a traffic channel with time multiplexed data symbols spread with a code, and further comprising:

a traffic channel despreading circuit having an input operatively connected to said combiner output, said traffic channel despreading circuit having an output to provide the despread data symbols combined from a plurality of transmission paths.

12. A receiver as in claim 9 wherein said plurality of variable delay circuits, said plurality of variable weighting circuits, and said combiner are a time-varying finite impulse response (FIR) filter having a signal input operatively connected to each said variable delay circuit signal input, a signal output operatively connected to said combiner output, and a plurality of delay and gain control inputs operatively connected to said delay and weighting circuit control inputs.

13. A receiver as in claim 12 in which the receiver further comprises:

at least 2 antennas, each said antenna having an input to accept communication and an output operatively connected to the receiver, whereby a larger number of transmission paths are provided to the receiver;

at least a first time-varying FIR filter, said first time-varying FIR signal input operatively connected to a first antenna; and at least a second time-varying FIR filter, said second time-varying FIR signal input operatively connected to a second antenna, whereby the signal diversity is improved with a larger number of signal paths.

* * * * *